6507X
E. R. Currier,
Piano Action,
Patented Apr. 22, 1831.
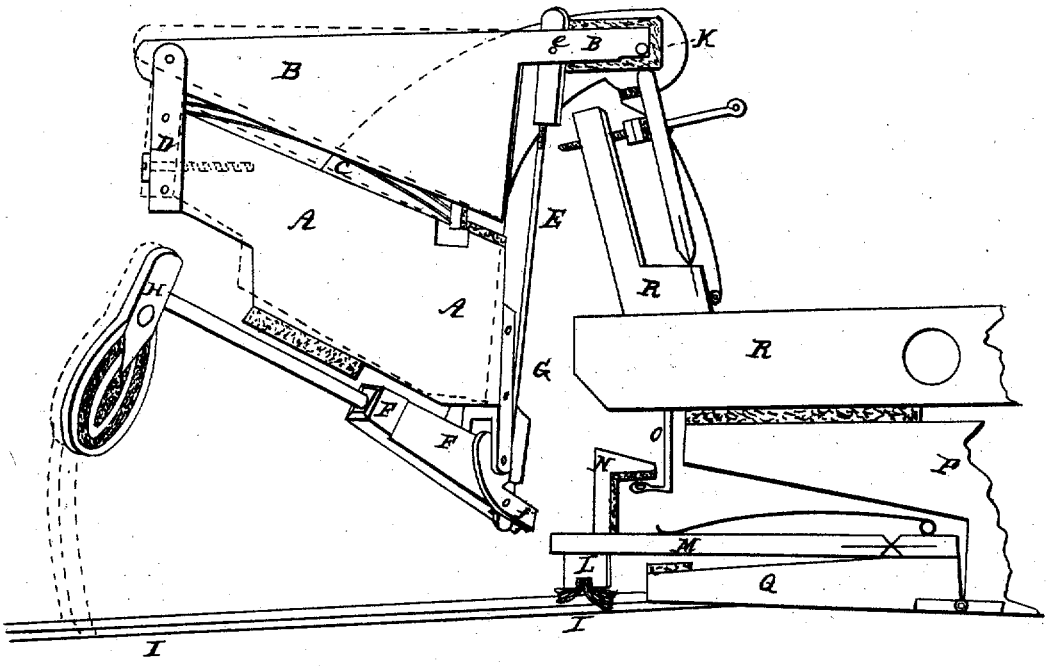
AM. PHOTO-LITHO. CO. N.Y. (OSBORNE'S PROCESS)

[illegible]

April 22. 1831 327

Ebenezer R. Currier 6507x

Letters Patent.

The schedule referred to in these Letters Patent and making part of the same containing a description in the words of the said Ebenezer R. Currier him self of his improvement in the horizontal square piano forte Know ye that I the said Ebenezer R. Currier, have invented a new and useful improvement in the horizontal square Piano Forte, where by each of the hammers is made to strike one or more of the strings belonging to its proper note at the pleasure of the performer. as is done in the horizontal grand piano forte, And by means of the said invention the following advantages of construction in horizontal piano fortes are obtained namely. First, that the key board may be placed exactly mid way of the instrument, which give the advantage of a compass of seven octaves. and admits of greater beauty & symmetry in the exterior of the instrument. Secondly, the key frame may be supported by a brace, which is secured to the lower frame of the case by bolts, or screws passing through supporters of the brace, Thirdly, the braces of the instrument may run in the direction of & very near to, the strings, by which means the instrument may be made stronger and lighter & will keep in tune much better than upon the common construction.

Fourthly, it admits of having a larger Sounding board than upon the common construction. Which several advantages of construction I also claim as my invention.

And I do hereby declare that the nature of my said invention & the manner in which it is to be made to operate and be carried into effect are fully set forth in the following Specification that is to say:

The action, in my piano fortes, consists of the following parts; which are arranged and combined as follows Viz A rail which I call the hammer rail extends from the upper to the lower part, of the scale of the piano forte, on the upper side of this rail I at an oblique angle

[illegible]

4/22/1831 6501X with its line of direction is placed a range of levers, which I call the ham-
mer levers, & which with their springs are inserted in thin flanges attached
to the back edge of the hammer rail; and these hammer levers correspond to
and are connected, as hereinafter mentioned, with the hammers which are
placed on the under side of said hammer rail. The hammer levers pro-
ject over the jack (which is of the usual construction) and motion is com-
municated to the hammer, by a connecting rod which passes down from
the hammer lever, & is inserted into the end of the hammer sockets which
are suspended under said rails by flanges with metal pivots.

The hammers may lie either parallel with or at a right angle or any
other angle with the direction of the strings. Each hammer in its or-
dinary situation will strike all the strings belonging to its note; but
by means of a pedal, which acts upon the hammer rail, the whole
range of hammers may be instantly thrown into such a position, that
each of them shall strike one or more of its proper strings at pleasure The hammer rail is adjusted by means of pivots, which are
placed in a line with the ends of the hammer levers in such a manner
that the hammers may be moved, so as to strike the strings in the
manner above described without altering the point of contact between
the lever & the jack. The whole construction of the action is such
as to prevent the usual recoil of the hammers.

The dampers are placed under the key frame & near the back
end of each hammer socket, they damp upon the same side of the
string that is struck by the hammer; they also damp at a greater dis
tance from the bridge than is usual in the common construction of piano
fortes, by which means the damping is more effectual; the dampers are
moved by a catch upon the top of their levers, which catch is acted
upon by a hook inserted into the under side of the keys & the whole of the
dampers may be thrown off the strings by means of a pedal.

And I do further annex to these presents a drawing of my said
invention and refer to the same in manner following to wit.
A.A., an end view of the hammer rail with its [illegible] plate screwed
on its ends by screws, B.B. the hammer levers, [illegible] the springs

4/22/1831 6507X of the hammer lever, D. the flange of the hammer lever. E. the connecting
rod passing from its pivot e. in the hammer lever to its pivot f. in the
end of the hammer socket, F.F. G. the flange of the hammer socket H,
the hammer in its natural position I.I. the strings, K. one of the two pivots
on which the hammer rail turns in order to move the hammer, so as to
strike one or more of their strings at pleasure. L, the damper, M. the
damper lever, under the key frame P. N. the damper lever catch on
which the hook (o) from the key, acts. O. the hook from the key, acting
on the catch of the damper lever, P, the key frame, Q. the damper
lever frame, R.R. the key jack In testimony that the above is a true specification of my said improve
-ment as above described, I have hereto set my hand & seal, this second
day of April in the year of our Lord one thousand eight hundred
and thirty one, Witness Joseph Sprague.

Geo. Haws.

Ebenezer R. Currier

E.t.
Ch.J.W.

[illegible]